United States Patent [19]
Hamada et al.

[11] Patent Number: 5,185,798
[45] Date of Patent: Feb. 9, 1993

[54] IC CARD SYSTEM HAVING A FUNCTION OF AUTHENTICATING DESTROYED DATA

[75] Inventors: Hiromi Hamada; Kazuya Hirano; Young S. Lee, all of Tokyo, Japan

[73] Assignee: NTT Data Communications Systems Corporation, Tokyo, Japan

[21] Appl. No.: 663,950

[22] PCT Filed: Jun. 15, 1990

[86] PCT No.: PCT/JP90/00785
 § 371 Date: Mar. 8, 1991
 § 102(e) Date: Mar. 8, 1991

[87] PCT Pub. No.: WO91/01892
 PCT Pub. Date: Feb. 21, 1991

[30] Foreign Application Priority Data
 Jul. 26, 1989 [JP] Japan .................. 1-191327

[51] Int. Cl.⁵ .................. H04K 1/00; H04K 9/00; G06K 5/00
[52] U.S. Cl. .................. 380/23; 235/382; 380/24
[58] Field of Search .................. 380/23, 24, 25; 235/382

[56] References Cited

U.S. PATENT DOCUMENTS

| | | | |
|---|---|---|---|
| 4,672,182 | 6/1987 | Hirokawa | 235/436 |
| 4,885,788 | 12/1989 | Takaragi et al. | 380/23 |
| 4,910,774 | 3/1990 | Barakat . | |
| 4,960,982 | 10/1990 | Takahira | 235/382 |
| 4,985,921 | 1/1991 | Schwartz | 380/24 |

FOREIGN PATENT DOCUMENTS

0030381 6/1982 European Pat. Off. .
0299826 1/1989 European Pat. Off. .

*Primary Examiner*—Stephen C. Buczinski
*Attorney, Agent, or Firm*—Frishauf, Holtz, Goodman & Woodward

[57] ABSTRACT

An IC card includes, in addition to an ordinary data recording processing circuit, an IC chip area including an encrypting circuit, and a magnetic or optical data recording unit mounted thereon. Those items of data at an initialization and final transaction times are recorded in the magnetic or optical data recording unit while a predetermined encryption is made in cooperation with the IC chip area and the terminal for initialization and terminal for transaction. When a data item to be recorded n the IC chip area in the IC card is destroyed, data items recorded on the magnetic or optical data recording area are decrypted to check if the recorded data items are true. If yes, these data items are restored in a new card.

3 Claims, 1 Drawing Sheet

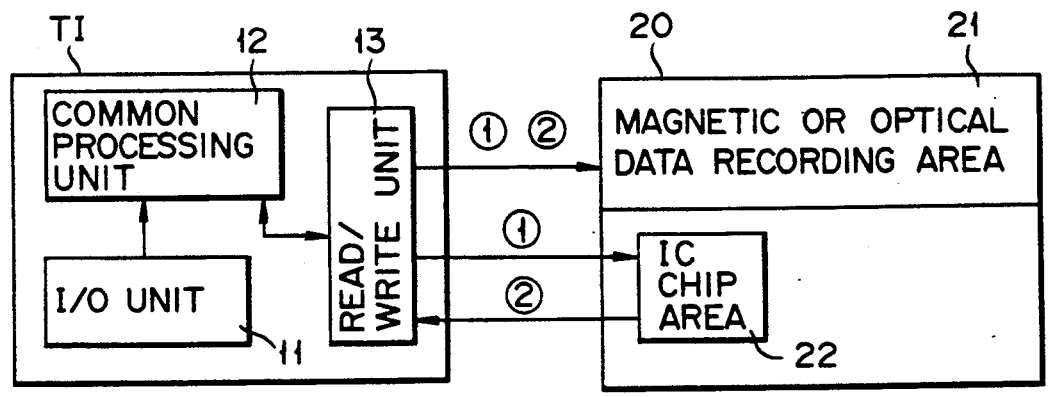
F I G. 1
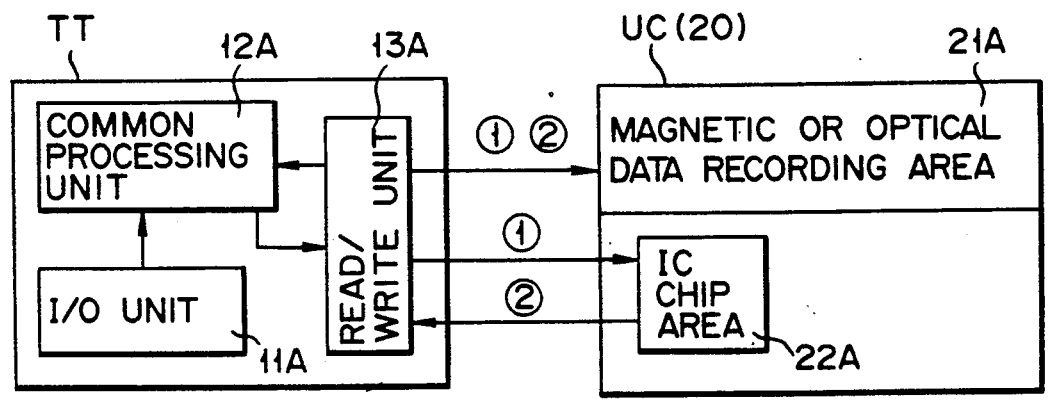
F I G. 2
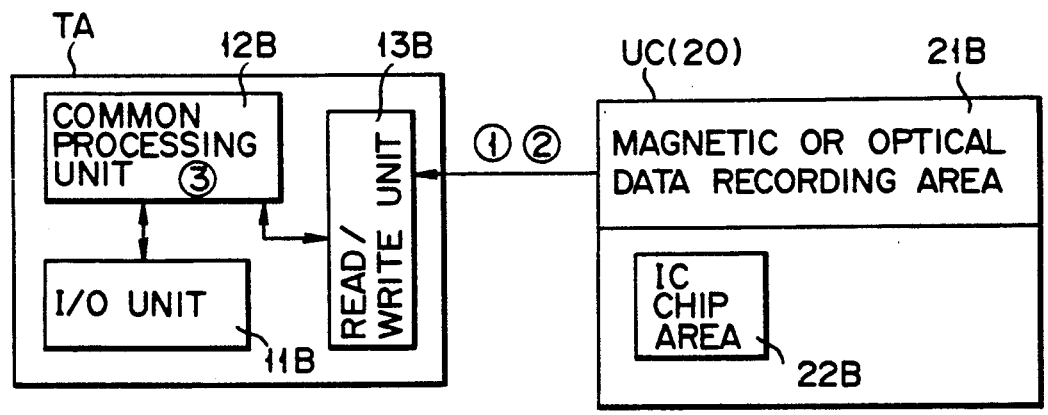
F I G. 3

IC CARD SYSTEM HAVING A FUNCTION OF AUTHENTICATING DESTROYED DATA

BACKGROUND OF THE INVENTION

The present invention relates to an IC card system and, in particular, an IC card system of such a type that, even if, upon the use of an IC card as a "prepaid" card for instance, data is found to be destroyed owing to a damaged IC chip, etc., data items, such as a "prepaid" balance, recorded in the IC card can be identified by the IC card and the terminal in a self-solving way without using any large-scale on-line system and can be restored with added safety.

A prepaid card, such as a conventional prepaid telephone card, is not safe from the standpoint of security, such as the protection of secret data and prevention of tampering. In the conventional prepaid card system, when data items in the prepaid card are maliciously or inadvertently destroyed by a card owner or any third party, there is no safe countermeasure for restoring data on a "prepaid" balance.

An IC card equipped with an IC version of a data storing/processing circuit is outstandingly superior to other cards from the standpoint of security, such as the protection of secret data and prevention of the tampering of data.

There is a relatively high possibility that, because such an IC chip is embedded in a plastics card, data items in the card will be destroyed, not to mention damage to the IC itself. Further, in the event of the data items being destroyed in the card, it is not possible to identify data, such as a "prepaid" balance. Even if any dispute arises between a card owner and a card issuing person in connection with the "prepaid" balance, there has been no effective solution to such a problem.

There is, therefore, a growing demand for identifying and restoring data items in the IC card system as set out above. An effective measure, therefore, is necessary to readily identify damaged data without using any large-scale on-line system and to prevent any possible misuse upon the re-issuing of an IC card.

It is an object of the present invention to provide an improved IC card system in which final transaction data items, once disturbed by encryption, are recorded in a magnetic or optical data recording unit whereby, when data items in the IC card are destroyed, the recorded data items are read out of the data recording unit to enable the read-out data items to be readily identified for their truth.

Another object of the present invention is to provide an IC card system which, when data items read out of a magnetic or optical data recording unit is proved true, restores the true data items in a new IC card.

SUMMARY OF THE INVENTION

According to the present invention, there is provided an IC card system for enabling data which is stored in an IC card equipped with an IC chip area and a magnetic or optical data recording area at its predetermined area to be authenticated in cooperation with a predetermined terminal, the system comprising:

a first unit for enabling data which is associated with a final transaction by the IC card to be subjected to a predetermined processing, including an encryption processing, by a predetermined data process made between an encrypting area stored in an IC area of the IC card and a read/write unit in a terminal for identification and between the read/write unit and a common processing unit;

a second unit for enabling data which is subjected by the first means to the processing to be transferred to the magnetic or optical data recording area via the read/write unit on the terminal and to be recorded there; and a third unit for enabling the processed data associated with the final transaction which is recorded on the magnetic or optical data recording area to be subjected to a predetermined re-processing, including a decryption processing at the read/write unit and common processing unit, when the data in the IC area of the IC card is destroyed, and for authenticating truth of the data.

According to another aspect of the present invention, an IC card system includes a fourth unit which, when the truth of the data re-processed by the third unit is authenticated, transfers that data from the terminal for identification to the terminal for initialization and restores it into a new card.

In summary, the present IC card system comprises:

a first unit for performing a predetermined data processing, including an encryption processing, relative to an initializing or transaction terminal in cooperation with an IC card and a code preparation unit in the IC card;

a second unit for recording final transaction data in a magnetic or optical data recording area of the IC card after it has been disturbed by a predetermined code; and a third unit for decrypting the data of the recording unit by the identifying terminal, when it is needed for restoration, so that it is identified for truth. The present IC card system further comprises a fourth unit which, when the data is proved true, enables data on a "prepaid" balance, etc., to be restored by the initializing terminal for re-issuing of a new IC card In the IC card system as set out below, when an IC chip of the IC card is inaccessible due to its damage, etc , the card owner requests the card issuing person to restore data on, for example, a "prepaid" balance so that it is re-issued The card issuing person re-processes final transaction data of the magnetic or optical data recording area through decryption with the use of an identifying terminal, for example, a card owner's built-in code function F and code key and prepares an identification code and compares it with an identification code which is read, as a to-be-re-processed data, out of the magnetic or optical data recording area If there is a coincidence between the two, the card issuing person authenticates it as being true, restores the final transaction data and issues a novel IC card.

BRIEF DESCRIPTION OF THE DRAWINGS

FIGS. 1 to 3 show an IC card system according to one embodiment of the present invention, FIG. 1 showing a state of a connection between an initializing terminal and an IC card as well as a data transfer between them and its control, FIG. 2 showing a state of a connection between a transaction terminal and an IC card as well as a data transfer between them and its control, and FIG. 3 showing a state of a connection between the IC card and an identifying terminal for identifying data of a magnetic or optical data recording area when data once stored in the IC card, if damaged, is restored, as well as a data transfer between the IC card and the terminal and its control.

DETAILED DESCRIPTION

An IC card system according to one embodiment of the present invention will be explained below with reference to the accompanying drawings.

FIG. 1 shows a state of a connection between an initializing terminal unit Tl and an IC card 20 and a data transfer between the two and its control which constitute one aspect of a restoration device of the present invention.

An initializing terminal unit Tl which is placed under complete control of an IC card issuer as his or her agent includes an input/output unit 11, common treating units 12 and read/write unit 13. The IC card 20 is initialized by the terminal Tl and handed over to a specific person who becomes a card owner.

The IC card 20 to be used by the card owner includes a magnetic/optical data recording area 21 and IC chip area 22.

The IC chip area 22 includes, in addition to an ordinary data storing/processing unit, a circuit (a code preparing unit) for processing a code function (F), both of which are absolutely inaccessible from the outside. A code key KUC which is unique to the IC card 20 is accessible by only a specific terminal, etc., which is owned or designated by a card issuer, and is initially stored in a chip area 22 of the IC card.

Those items of issuing data (that is, issuing data TD (1)) as input from the input/output unit 11 in the terminal unit Tl or automatically generated from the processing unit 12 are stored as initial history data into the IC ship area 22 of the IC card 20 from the read/write unit 13 in the initializing terminal unit Tl, the items of data containing the data of issuing, placeof-issuing (initializing terminal ID) code, amount of money received upon issuance, a "prepaid" balance upon issuance, etc.

A symbol (1) in the issuing data TD (1) represents the transfer of data on the drawing sheet. The same thing can be applied to those items of data and code as will be set forth below.

The data TD (1) and authentication code, hereinafter referred to as [identification code TC (2)] generated based on the data TD (1), are registered in the magnetic/ optical data storing area 21 of the IC card 20.

The identification code TC (2) is a multi-digit code uniquely determined by the issuing data TD (1), that is, a result of an arithmetic operation obtained in accordance with a function F using the code key KUC and transaction data TD (1), the function F being incorporated into the chip area 22 in the IC card 20. The code TC (2) is taken into the IC card via the read/write unit 13 in the terminal unit Tl.

The terminal unit Tl encrypts the identification code TC (2 together with the data TD (1) and delivers it via the read/write unit 13 to the magnetic or optical data recording unit 21 where it is stored.

A relation among the code function F, data TD, identification code TC and code key KUC is represented by:

TC=F(TD, KUC)

FIG. 2 shows a data transfer, that is, goods or services transferred, by a prepaid action, with the use of a user IC card UC which has been given to the card owner after initialization.

FIG. 2 shows the case where a card owner inserts or loads the user IC card UC into a transaction terminal unit TT as installed at a shop or at a street corner.

Those items of transaction data (hereinafter referred to as transaction data TD (1) for the sake of convenience) entered from an output section (an input/output unit 11A) of the transaction terminal TT or automatically generated from a common control unit 12A are added to a history at a time of card issuance, or updated via a read/write unit 13A, the transaction data containing a transaction data, site-of-transaction (terminal) code, amount of transaction, "prepaid" balance, prepayment and so on and being the same format as that of the aforementioned issuing data TD (1).

Transaction data TD (1) involved in a final transaction as well as an authentication code (hereinafter referred to as an identification code TC (2) for the sake of convenience) generated in the same format as that of the identification code TC (2) is encrypted via the read/write unit 13A and written into a magnetic/optical data storing area 21A in the user IC card UC.

Although a step of charging or receiving a price or a payment for goods and services, by a goods/services provider or an agent, as a result of a transaction is omitted for brevity's sake, it is done in the process substantially the same as set forth above.

Let it be assumed that data in the chip area 22A in the user IC card UC cannot be read out due to a breakage, etc., of the IC chip area 22A and that a transaction fails to continue owing to a "prepaid" balance being placed in an inaccessible state.

In this case, the owner of the user IC card presents a defective IC card UC to the card issuing person or his or her agent, claiming that a "prepaid" balance should be guaranteed. The card issuing person or his or her agent handles a restoring terminal TA as shown in FIG. 3 in accordance with the claim of the card owner and restores and identifies that "prepaid" balance. The card issuing person or his or her agent takes a proper step such as the reissuing of an IC card to guarantee the "prepaid" balance.

That is, on the side of the card issuing person or his or her agent, a code key KUC of the user IC card UC is arithmetically operated on by the terminal TA in accordance with a secret key KAC and the same function F as a code function built in the user IC card UC of the card owner as well as a card recognition data recorded in magnetic or optical data recording unit 21B inscribed in the IC card, noting that the key KAC and function F can be stored in an authentication-only IC card so as to further enhance a security level. An identification code TC (3) is generated, in the same way as set out above, from the code key KUC thus obtained and transaction data TD (1) in those items of data read out of the magnetic or optical data recording area 21B. This identification code (3) is compared with an identification code TC (2) in those data items which are read out of the magnetic or optical data recording area 21B.

If a coincidence occurs as a result of comparison, the transaction data TD1 in the data items read out of the magnetic or optical data recording area 21A can be regarded as being not maliciously altered by something.

The card issuing person or his or her agent performs an issuing operation of a new IC card 20 (UC), in accordance with the sequence as set out in connection with FIG. 1, with the use of a "prepaid" balance on a final transaction in the read-out transaction data TD (1).

Although the present embodiment has been explained in connection with the present invention, when the transaction terminal TT delivers transaction data TD (1) and identification code TC (2) to the magnetic or optical data recording area, TD (1) and TC (2) are encrypted as a whole for enhanced security to place an encrypted one generally under an inaccessible state and encryption is done prior to the process of restoring and identifying data, such as a "prepaid" balance, regarding a final transaction by the terminal TA. This modification constitutes an extension and hence another application which is covered by the present invention.

The IC card system of the present invention is operated as set out above. That is, the final transaction data of the IC card, once disturbed by the code, is registered in the magnetic or optical data recording area. It is, therefore, difficult for any malicious person to read out the final transaction data. Even if the data is tampered with, identification can be made, upon request by the IC card owner, on the card issuing person's side, whether or not the data in the magnetic or optical recording area is tampered with. Since data, such as a "prepaid" balance, cannot be restored in a new IC card unless the card owner confirms the truth of the data, it is possible to prevent any misuse of the card upon re-issuing of it.

Since the present IC card system has the features as set out above, if the card owner asks the card issuing person to replace a damaged card by a new one, the person can readily confirm the truth of final transaction data in the IC card without using any large-scale on-line system and re-issue a new IC card with a restored true "paid" balance, etc., registered therein, preventing any trouble from arising between the card issuing person and the card owner. The present IC card system ensures high security and hence very high safety.

The present invention can be applied to an IC card system, in general, performing, for example, an individual authentication, data management and credit transaction.

We claim:

1. An IC card system for enabling data, which is stored in an IC card having an IC chip area and an optical data recording area at a predetermined area on the IC card, to be authenticated in cooperation with a predetermined terminal, said IC card system comprising:
   first means for enabling data, which data is contained in connection with a final transaction by the IC card, to be subjected to a processing operation with a transaction authentication code generated in accordance with a code function and an authentication individual key specific for the IC card, the processing operation being done through predetermined data processing made between an external terminal including a common processing unit and an external read/write unit, said terminal being an initialization terminal or a transaction terminal, and said first means further including means for storing the resulting processed data in the IC chip area of the IC card;
   second means for transferring said resulting processed data to the optical data recording area of the IC card via the read/write unit of the terminal and for recording said resulting processed data on said optical data recording area of the IC card; and
   third means for checking said resulting processed data associated with the final transaction which is recorded on said optical data recording area, for truthfullness with the use of a code or decoding function of said rear/write unit and common processing unit, when data in the IC chip area of the IC card is destroyed.

2. The system according to claim 1, further comprising fourth means for, when the truth of the data checked by said third means is authenticated as being true, transferring that data from said transaction terminal to said initialization terminal and for restoring the transferred data into a new IC card.

3. The system according to claim 1, wherein said data checked by said third means contains data on a prepaid balance.

* * * * *